United States Patent
Pacella et al.

(10) Patent No.: US 10,447,770 B2
(45) Date of Patent: Oct. 15, 2019

(54) BLOCKCHAIN MICRO-SERVICES FRAMEWORK

(71) Applicant: Verizon Patent and Licensing Inc., Arlington, VA (US)

(72) Inventors: Dante J. Pacella, Charles Town, WV (US); Ashish Sardesai, Ashburn, VA (US); Mani Tadayon, Leesburg, VA (US); Saravanan Mallesan, Fairfax, VA (US); Sonit Mahey, Leesburg, VA (US); Lee E. Sattler, Mount Airy, MD (US); Venkata Josyula, Ashburn, VA (US); Jean M. McManus, Bernardsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 227 days.

(21) Appl. No.: 15/607,754

(22) Filed: May 30, 2017

(65) Prior Publication Data

US 2018/0352033 A1 Dec. 6, 2018

(51) Int. Cl.
*H04L 29/08* (2006.01)
*H04L 9/32* (2006.01)

(52) U.S. Cl.
CPC .......... *H04L 67/10* (2013.01); *H04L 9/3239* (2013.01); *H04L 67/2838* (2013.01); *H04L 2209/38* (2013.01)

(58) Field of Classification Search
CPC .... H04L 67/1097; H04L 67/34; H04L 9/0637
See application file for complete search history.

(56) References Cited

U.S. PATENT DOCUMENTS

| | | | | |
|---|---|---|---|---|
| 9,298,806 B1* | 3/2016 | Vessenes | ............ | G06Q 20/065 |
| 9,397,985 B1* | 7/2016 | Seger, II | ............ | H04L 63/0442 |
| 9,875,510 B1* | 1/2018 | Kasper | ............ | G06Q 40/12 |
| 2015/0262176 A1* | 9/2015 | Langschaedel | ...... | G06Q 20/065 |
| | | | | 705/71 |
| 2015/0278820 A1* | 10/2015 | Meadows | ........ | G06Q 20/40145 |
| | | | | 705/64 |
| 2015/0356524 A1* | 12/2015 | Pennanen | ............ | G06Q 20/065 |
| | | | | 705/71 |
| 2016/0164884 A1* | 6/2016 | Sriram | ............ | G06Q 10/06315 |
| | | | | 705/51 |
| 2016/0259937 A1* | 9/2016 | Ford | ............ | G06F 21/554 |
| 2016/0261685 A1* | 9/2016 | Chen | ............ | H04L 67/104 |
| 2016/0342988 A1* | 11/2016 | Thomas | ............ | G06Q 20/401 |

(Continued)

*Primary Examiner* — Joe Chacko

(57) ABSTRACT

A network device receives a first application programming interface (API) call from an application. The first API call requests a micro-service of a blockchain-based technology. The blockchain-based technology includes use of a shared ledger among participating nodes in a distributed consensus network. The micro-service provides a function for the application. The network device sends, in response to the first API call, a second API call to one of the participating nodes. The second API call initiates a framework module of a multiple of framework modules in the participating nodes. The network device receives, from the one of the participating nodes, a response to the second API call, the response indicating consensus of the participating nodes. The network device generates, based on the response to the second API call, a reply to the first API call.

20 Claims, 9 Drawing Sheets

(56) References Cited

U.S. PATENT DOCUMENTS

| | | | |
|---|---|---|---|
| 2017/0046664 A1* | 2/2017 | Haldenby | G06Q 20/0655 |
| 2017/0111175 A1* | 4/2017 | Oberhauser | H04L 9/3247 |
| 2017/0244721 A1* | 8/2017 | Kurian | H04L 63/105 |
| 2018/0315025 A1* | 11/2018 | McKay | G06Q 40/08 |

* cited by examiner

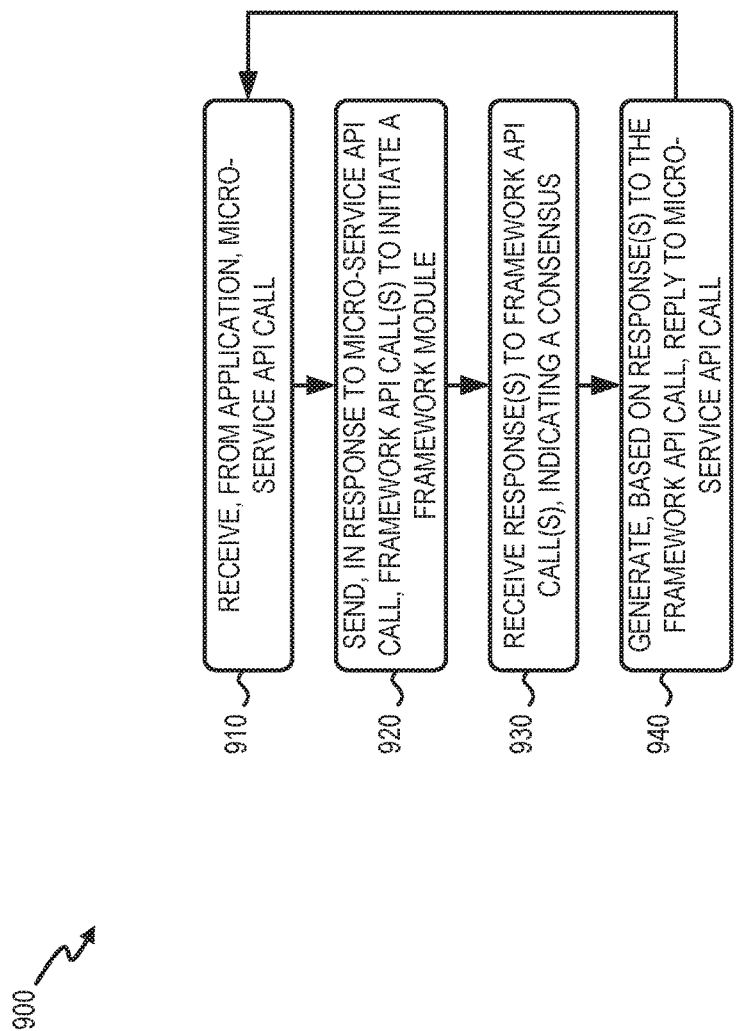

though only three are referenced in FIG. 1 as links
BLOCKCHAIN MICRO-SERVICES FRAMEWORK

BACKGROUND

Connected devices (which may include basically any device with connection to the Internet) have nearly limitless applications that can be leveraged to form new and useful services. These services for connected devices are distributed and managed by various control points that users can access in a variety of ways. Blockchain provides an increasingly popular option for authentication and verification aspects of these services. Blockchain is a secure transaction ledger database that is shared among nodes participating in an established, distributed network of computers. Blockchain technology typically relies on an ever-growing proof-of-work chain to validate information blocks added to the transaction ledger. Blockchain is nascent technology and developing at a rapid pace, splintering into many different offshoots, each with its own strengths and weaknesses.

BRIEF DESCRIPTION OF THE DRAWINGS

FIG. 9 is a flow diagram illustrating an exemplary process for implementing blockchain micro-services.

DETAILED DESCRIPTION OF THE PREFERRED EMBODIMENTS

The following detailed description refers to the accompanying drawings. The same reference numbers in different drawings may identify the same or similar elements.

Implementations described herein provide a framework for providing blockchain-based micro-services in a distributed environment. Blockchain technology may be provided as a service that includes a compilation of discrete micro-services. A micro-service architecture allows for focused development and risk management. For example, as different and increased use of blockchain concepts continue to develop, the underlying cryptography may change, leading to the introduction of new technologies or variants. These new technologies may be faster, less CPU intensive, less memory intensive, offload more processing to side chains, provide more privacy, be more transparent, and/or have more intelligence. These emerging changes may impact one micro-service more than another. Furthermore, blockchain micro-services can be offered to an existing platform to augment or replace less reliable services with similar functions in a more reliable manner.

According to one implementation, a network device may receive a first application programming interface (API) call, such as an API call from an application on a client device or an API call from another network device. The first API call requests a micro-service of a blockchain-based technology. The blockchain-based technology includes use of a shared ledger among participating nodes in a distributed consensus network. The micro-service provides a discrete function for the application. The network device may send, in response to the first API call, a second API call to one of the participating nodes. The second API call initiates a framework module of a multiple of framework modules available in the participating nodes. The network device may receive, from the one of the participating nodes, a response to the second API call, the response indicating consensus of the participating nodes. The network device may generate, based on the response to the second API call, a reply to the first API call.

Figure 1:
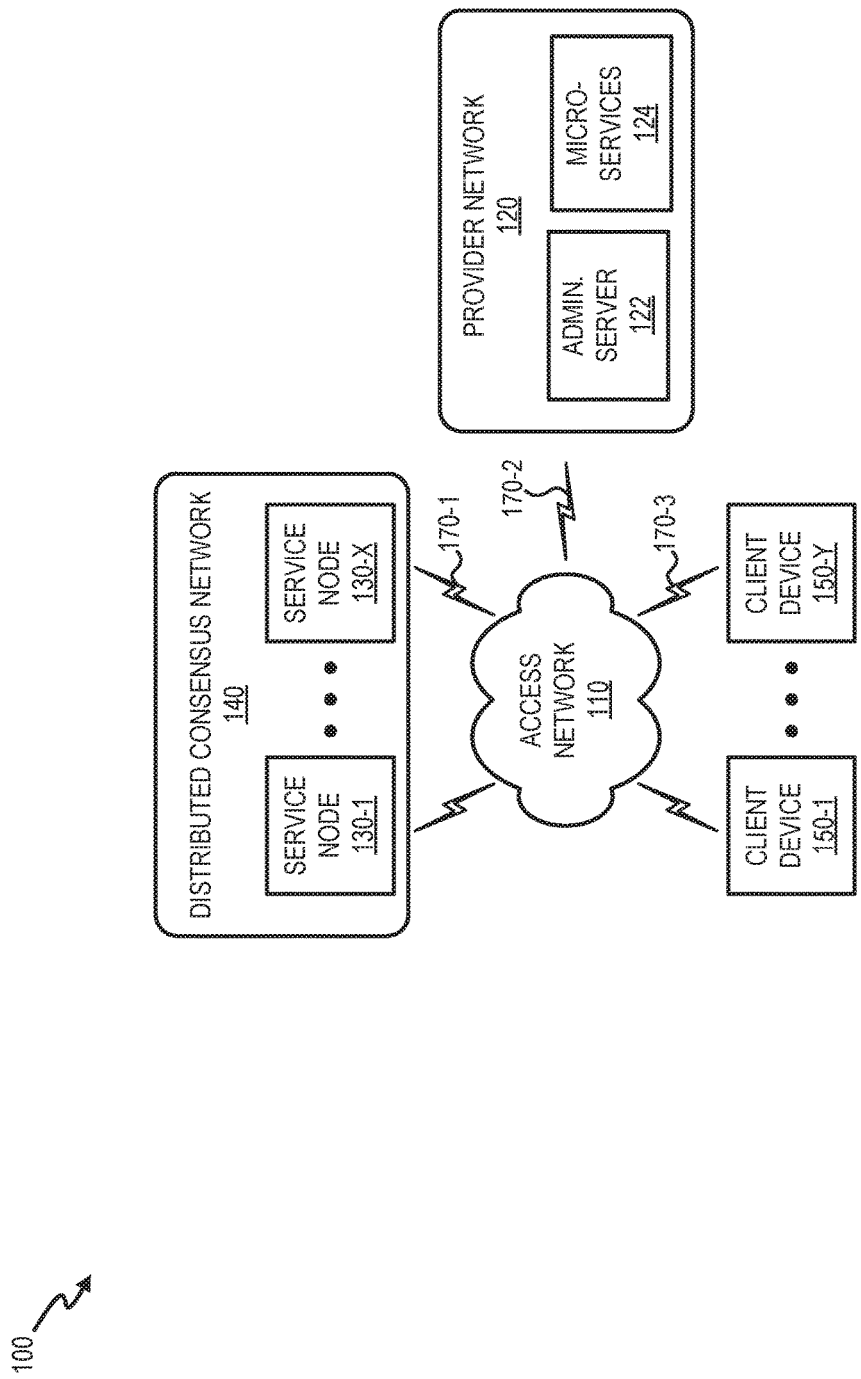
FIG. 1 is a diagram that depicts an exemplary network environment in which systems and methods described herein may be implemented.

FIG. 1 is a diagram illustrating an exemplary network environment 100 in which systems and methods described herein may be implemented. As illustrated, environment 100 may include an access network 110, a provider network 120, service nodes 130-1 through 130-X (also referred to as collectively as "service nodes 130" and, individually or generically as "service node 130") in a distributed consensus network 140, and client devices 150-1 through 150-Y (also referred to as collectively as "client devices 150" and, individually or generically as "client device 150").

Access network 110, provider network 120, service nodes 130, distributed consensus network 140, and client devices 150 may include one or more network elements or be combined within one or more network elements. Provider network 120, for example, may have multiple network elements including, but not limited to, an administration server 122 and a micro-services platform 124. A network element may be implemented according to a centralized computing architecture, a distributed computing architecture, or a cloud computing architecture (e.g., an elastic cloud, a private cloud, a public cloud, a virtual cloud etc.). Additionally, a network element may be implemented according to one or multiple network architectures (e.g., a client device, a server device, a peer device, a proxy device, and/or a cloud device).

As further illustrated, environment 100 includes communication links 170 between the network elements and networks (although only three are referenced in FIG. 1 as links 170-1, 170-2, and 170-3). A network element may transmit and receive data via a link 170. Environment 100 may be implemented to include wireless and/or wired (e.g., electrical, optical, etc.) links 170. A communication link between network elements may be direct or indirect. For example, an indirect communication link may involve an intermediary device or network element, and/or an intermediary network not illustrated in FIG. 1. Additionally, the number, the type (e.g., wired, wireless, etc.), and the arrangement of links 170 illustrated in environment 100 are exemplary.

Access network 110 may include one or multiple networks of one or multiple types. For example, access network 110 may include a terrestrial network, a satellite network, a wireless network, and/or a wired network. In some implementations, access network 110 may incorporate other networks, such as a core network or a backhaul network.

Provider network 120 includes one or multiple networks of one or multiple types. For example, provider network 120 may include an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, provider network 120 includes administration server 122 and micro-services platform 124. According to other exemplary embodiments, administration server 122, micro-services platform 124, and/or portions thereof may be combined in a single device or a distributed environment.

Administration server 122 includes one or more network devices that provide administrative functions for client devices 150 to access blockchain micro-services. For example, administration server 122 may provide configuration/provisioning for customers to set up applications that will access blockchain micro-services. Administration server 122 may manage permissions for client devices 150 (or user thereof) to access services from provider network 120 and/or distributed consensus network 140.

Micro-services platform 124 includes one or more network devices that provide blockchain micro-services that can be accessed by client devices 150, such as client devices running applications or other solutions. Micro-services platform 124 may include an index of available micro-service options, a registration component to provide access to selected micro-services, and communications handling. Applications may access micro-services via a set of APIs. An API may use a collection of software functions and procedures, referred to as API calls, that can be executed by other software applications. For example, as described further herein, micro-services platform 124 may receive API calls from an application (e.g., an application residing on client device 150 or an application server) and initiate one or more blockchain micro-service performed by service nodes 130 in distributed consensus network 140. In one implementation, administration server 122 or micro-services platform 124 may include logic that allows for validating an API call from client device 150 before performing the micro-service associated with the API call.

Service node 130 includes one or more network devices that provide storage and/or computing resources for blockchain micro-services. In one implementation, for example, service node 130 may include a third-party-owned network device that is in a separate domain from provider network 120. In another implementation, service node 130 may be part of a network that is associated with provider network 120. According to an implementation described herein, each service node 130 may leverage a shared ledger to provide a particular micro-service for applications residing on client devices 150.

Distributed consensus network 140 may include network devices that participate in blockchain-based technologies, including validation of shared ledger entries. In one implementation, distributed consensus network 140 may include some or all of service nodes 130. In another implementation, distributed consensus network 140 may consist of nodes (not shown) other than service nodes 130. For example, multiple servers or proxy nodes running in cloud or edge compute clusters/farms can be leveraged as a consensus network to reduce a burden on service nodes 130. Alternatively, distributed consensus network 140 may include service nodes 130 in different private domains. Each participating node in distributed consensus network 140 maintains a continuously-growing list of records referred to herein as a "shared ledger," which may be associated with a particular micro-service and which is secured from tampering and revision. Any updates from a trusted node will be added into the shared ledger. Each version of the shared ledger contains a timestamp and a link to a previous version of the shared ledger. The authorization is added in chronological order to the shared ledger, and the shared ledger is presented to each of participating service nodes 130 in distributed consensus network 140 as a cryptographically secured block. Each entry of the shared ledger may be considered a node in a hash tree structure for efficiency. This hash tree ensures that blocks received from the trusted node are received undamaged and unaltered, and enables distributed consensus network 140 to check that the other nodes in distributed consensus network 140 do not have fraudulent or inaccurate blocks in the shared ledger.

Client device 150 may include a connected device or computing device operated by a user or on behalf of a user. Client device 150 may request items or services, which require blockchain services, from one or more of administration server 122, micro-services platform 124, or service node 130. In one implementation, client device 150 may send a request to micro-services platform 124 for a service. The request may use, for example, an API call for the particular micro-service. The API call may cause micro-services platform 124 to initiate a blockchain activity in distributed consensus network 140.

Links 170 provide communication paths between network elements and/or networks of environment 100. Links 170 may have certain characteristics, such as bandwidth capacity, transmission data rate, and the like.

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple administration servers 122, micro-services platforms 124, and so forth. Additionally, or alternatively, according to other embodiments, multiple network elements may be implemented on a single device, and conversely, a network element may be implemented on multiple devices. For example, all or portions of micro-services platforms 124 may be included within a service node 130. In other embodiments, one network in environment 100 may be combined with another network.

Figure 2:
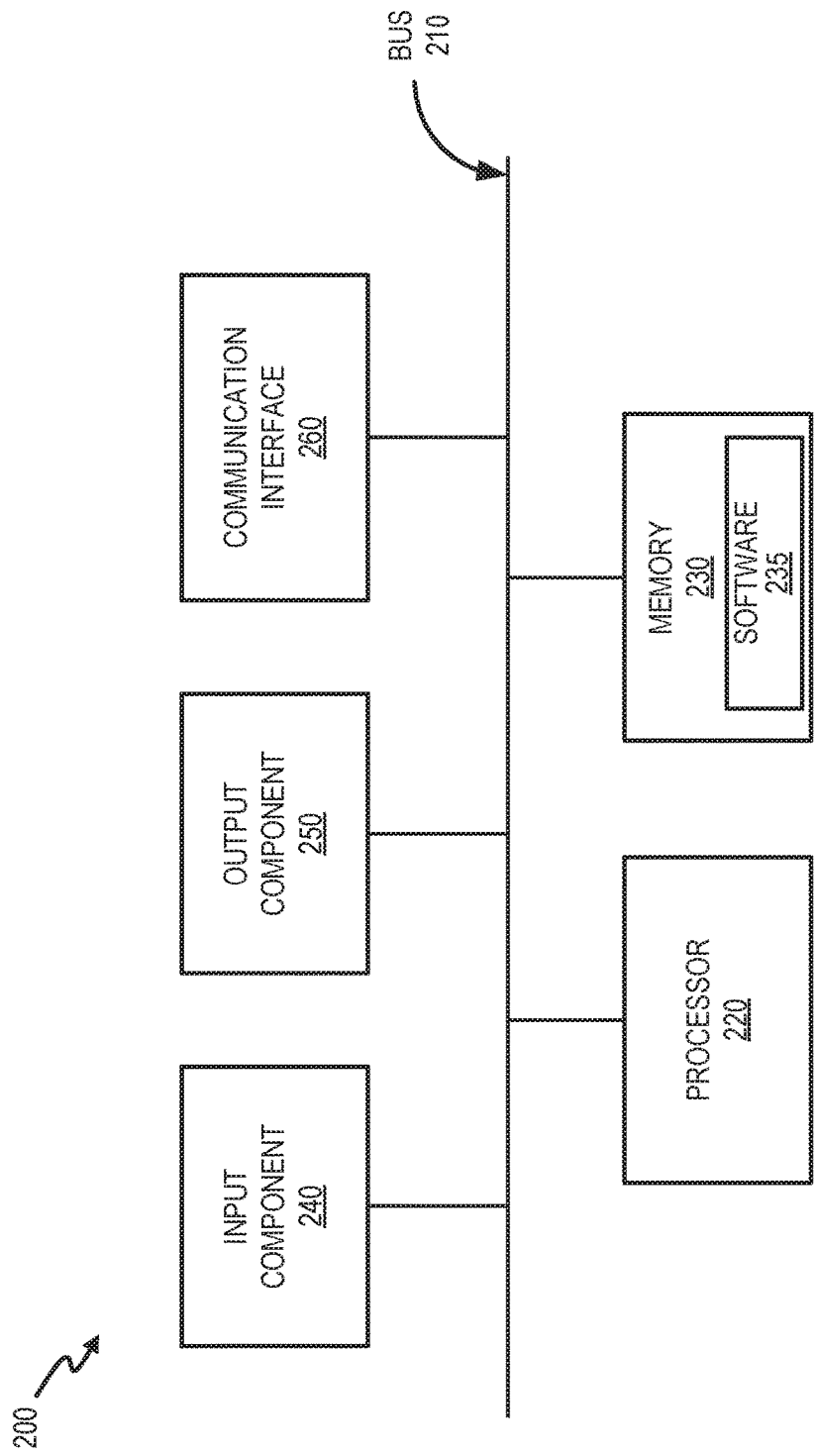
FIG. 2 is a diagram illustrating exemplary components of a device that may correspond to the network elements and client devices depicted in the environment of FIG. 1.

FIG. 2 is a diagram illustrating exemplary physical components of a device 200. Device 200 may correspond to each of the network elements, including administration server 122, micro-services platform 124, service nodes 130, and client devices 150 depicted in network environment 100. Device 200 may include a bus 210, a processor 220, a memory 230 with software 235, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 may also include firmware, middleware, microcode, hardware description language (HDL), and/or other form of instruction. By way of example, with respect to the network elements that include logic to provide blockchain micro-services, these network elements may be implemented to include software 235. Additionally, for example, client device 150 may include software 235 (e.g., an application to communicate with micro-services platform 124, service node 130, etc.) to perform tasks as described herein.

Input component 240 may include a mechanism that permits a person to input information to device 200, such as a keyboard, a keypad, a button, a switch, etc. Output component 250 may include a mechanism that outputs information to the person, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. As another example, device 200 may include one or more switch fabrics instead of, or in addition to, bus 210. Additionally, or alternatively, one or more components of device 200 may perform one or more tasks described as being performed by one or more other components of device 200.

Figure 3:
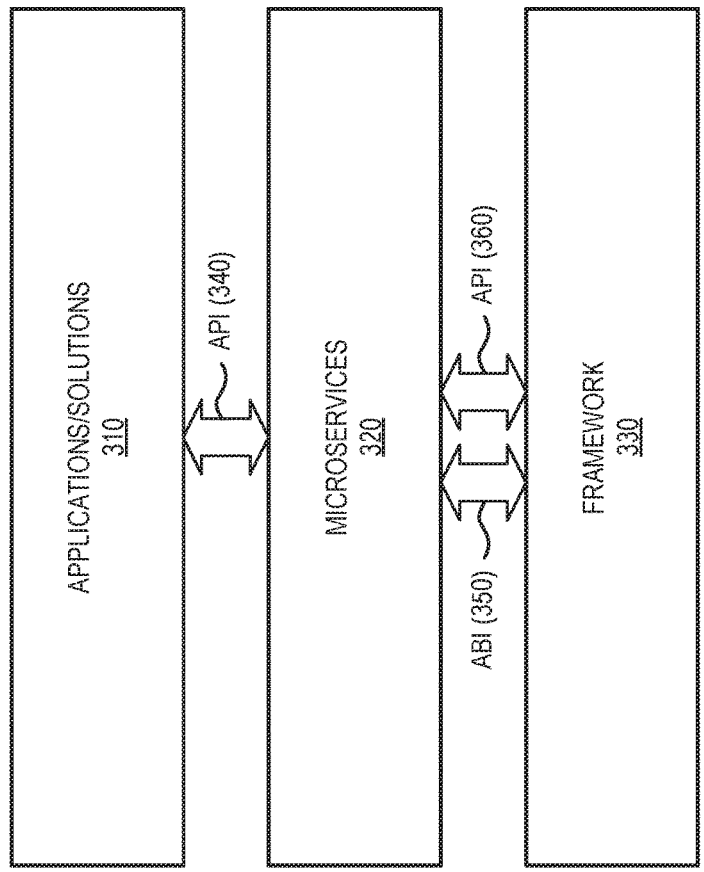
FIG. 3 is a diagram illustrating an exemplary logical framework for providing blockchain micro-services, according to an implementation described herein.

FIG. 3 is a diagram illustrating an exemplary logical framework for providing blockchain micro-services. As shown in FIG. 3, a set of applications or solutions 310 leverage micro-services 320, which leverage an underlying framework 330. Applications/solutions 310 may reside, for example, on client devices 150. Micro-services 320 may reside on micro-services platform 124 and/or service nodes 130. Examples of applications/solutions 310 may include payment applications, digital marketplace applications, rental equipment applications, and numerous other types of applications. Examples of a micro-service 320 may include repudiation, authentication and authorization, digital coins, chain of custody, validating a transaction, multi-party settlement, etc. In one implementation, a micro-service 320 may be initiated by one of applications/solutions 310 using an API 340 for the particular micro-service. More than one application/solution 310 can leverage the same micro-service 320. Also, each application/solution 310 can call as many different micro-services 320 as needed.

Micro-services 320 may apply modules from framework 330 to accomplish a particular micro-service. For example, one micro-service 320 may apply multiple modules from framework 330 to perform the micro-service. In one implementation, each module from framework 330 may be initiated using an application binary interface (ABI) 350 or a different API 360 for the particular framework item. Thus, an API call for a single micro-service may cause the micro-service to generate multiple API calls and/or ABI requests to different framework modules. Execution of API calls may result in a response from an ephemeral execution of a set of blockchain function(s) (e.g., micro-service(s) or framework service(s)) or may also result in the perpetual execution of a set of blockchain functions.

Figure 4:
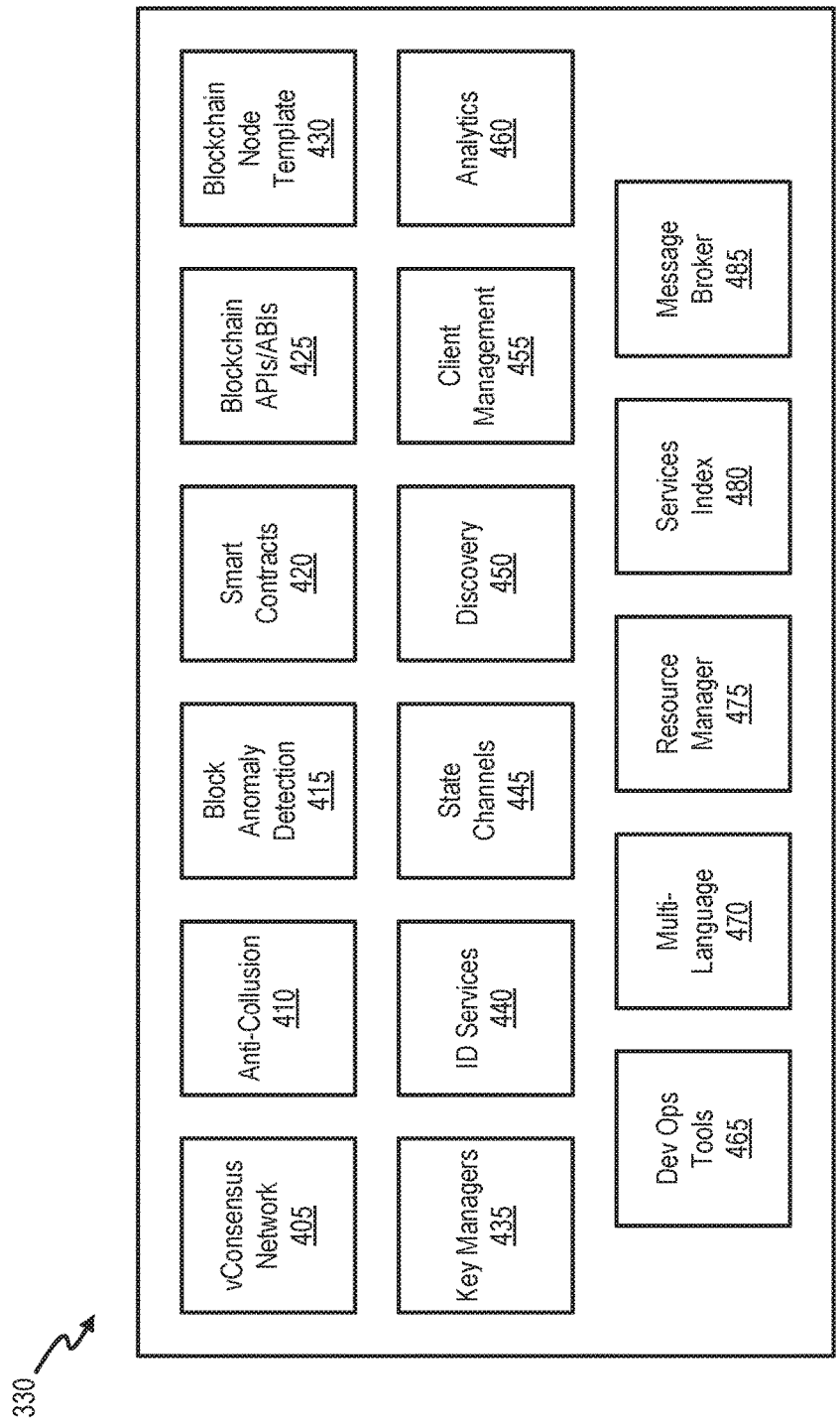
FIG. 4 is a diagram illustrating logical components of the framework of FIG. 3.

FIG. 4 is a diagram illustrating exemplary logical components of framework 330. As shown in FIG. 4, framework 330 may include a virtual consensus network module 405, anti-collusion module 410, a block anomaly detection module 415, a smart contracts module 420, an API/ABI module 425, a blockchain node template 430, a key managers module 435, an identification (ID) services module 440, a state channels module 445, a discovery module 450, a client management module 455, an analytics module 460, a development operations (dev ops) tools module 465, a multi-language module 470, a resource manager module 475, a services index module 480, and a message broker module 485. In one implementation, the modules described in connection with FIG. 4 may be performed by one or more components of service nodes 130. In another implementation, the modules described in connection with FIG. 4 may be performed by services nodes in conjunction with administrative server 122 and micro-services platform 124. Some or all of the modules of FIG. 4 may be included, for example, in an application (e.g., software), stored in memory 230 and executed by processor 220.

Virtual consensus network module 405 provides a consensus and mining virtual node that can be added to expand distributed consensus network 140 as needed. Virtual consensus network module 405 may be limited to devices from a single cloud provider, multiple cloud providers each with their own pool working in collaboration, or users selectively joining existing pools or forming their own pools. In single or multiple cloud provider arrangements, virtual consensus network modules 405 are permissioned (e.g., require prior approval from an entity service network 120). In one implementation, virtual consensus network module 405 may include a pluggable consensus module (e.g., each Application creator can create pluggable consensus modules or use prebuilt modules provided by the framework).

Anti-collusion module 410 may prevent overtake of distributed consensus network 140 by a cartel (e.g., consensus network 51% cartel prevention, where an unauthorized group of nodes attempts to provide sham consensus). Anti-collusion module 410 may run reporting on historical behaviors per node (e.g., service node 130), per pool (e.g., collection of service nodes 130), and network-wide. Anti-collusion module 410 may monitor orphan/uncles (e.g., similar blocks in the blockchain that are not part of the longest chain), transaction fees, number of blocks, and time to solution. Anti-collusion module 410 may request more nodes if compute imbalances are detected.

Block anomaly detection module 415 may determine a rate of block creation, the number of transactions per block, transaction fees per transaction and block, and uncles/uncle blocks. Block anomaly detection module 415 may establish a baseline and alert or act on detected deviations.

Smart contract module 420 stores and manages smart contracts for users of client devices 150. Smart contract module 420 may also provide a development environment for smart contracts that includes templates for various types/classes of contracts with input variables. A smart contract may apply to one or multiple users. Smart contracts can also be built and signed by third-parties, such as legal or regulatory entities. In one implementation, smart contracts can be built as sub-routines to be called by other smart contracts (as appendices, for example). For example, a sub-routine may be used to allow initial rights holders, such as producers of content/goods, to be compensated through a micro-transaction of a portion of resale or lease/rental by requiring an initial rights holder sub-routine to be called from a resale smart contract.

API/ABI module 425 control external interfaces with, for example, smart contracts of smart contract module 420. According to one implementation, API/ABI module 25 may restrict particular nodes (e.g., service nodes 130) to read-only operations and permit read/write operations by only trusted nodes (e.g., within a private group). For base micro-service templates and smart contract templates, API/ABI module 425 provides a standard set of APIs for the service (backend and frontend, endpoint, and data flow) and ABIs for the contracts.

Blockchain node template 430 enables aggregation of various distributed storage mounts, local and clustered computing (via central processing unit (CPU), general processing unit (GPU), or both, as well as application-specific integrated circuit (ASIC)-based or numeric processing unit (NPU)-based hardware driven by CPU operations), as well as backup facilities, micro-services, scheduling and resource rules, and developer operations tools. In one implementation, blockchain node template 430 may assemble features as a portion of a single "compute node" running in one or more containers. In another implementation, features may run across multiple nodes as a virtual aggregation of micro-services.

Key managers module 435 may implement aspects of security algorithms, including but not limited to, algorithm selection amongst a set of cipher suites (by the developer), its associated key management and distribution, and its subsequent invocation (during run-time) for encryption, obfuscation, anonymization, pseudonymization, signature generation, or any other security-related operations in the process of a blockchain-based micro-service or service execution. Additionally, key managers module 435 may offer capabilities to enable rapid addition of new cipher suites to an already existing set. Key managers module 435 may register and distribute public keys and ID pairings. According to one implementation, key managers module 435 may an also associate IDs and keys with context (conditional/environment/application).

Identification (ID) services module 440 may create IDs for any service or device not able to self-generate IDs. ID service module 440 may also interface with services index module 480 to arbitrate from detected collisions.

State channels module 445 enables messaging over state channels between a pair of nodes (e.g., service nodes 130) or a pair of wallets (e.g., on client devices 150) or other peer constructs off-chain (e.g., not written to the blockchain if both parties agree on the zero-sum transaction). State channels may be between instances of the same micro-service or between services, regardless of physical node instantiation. In some aspects, state channels may be between data centers.

Discovery module 450 may discover new nodes and advertise new node information to other nodes/members in the community of interest (e.g., distributed consensus network 140). In a permissioned system, discovery module 450 may be inactive, as a registration process would manage propagation of knowledge regarding the new host, ID, and network attachment information. In a permissionless system, a discovery process (implemented through discovery modules 450) can discover new nodes and advertise this node information to other members in the community of interest.

Client management module 455 permits management of wallets, accounts, and other end-client utilities (e.g., accessed through client devices 150) leveraging blockchain services.

Analytics module 460 may collect and analyze data such as block rate, uncles/orphans rate, transaction fee trends, and other statistical analyses of the blockchain networks and their data. Analytics module 460 may provide data for use in anomaly detection, anti-collusion, and other micro-services.

Development operations tools module 465 may provide software modules, templates, services, and the like for developers to create and monitor micro-services. Development operations tools module 465 may include, for example, blockchain Node health monitors, blockchain micro-service health monitors (e.g., per service/per instance), smart contract validators, aggregate prediction schedulers, chain analyzers, anti-collusion analyzers, kernel analyzers, log analyzers, memory analyzer, input/output (I/O) usage monitors, vulnerability detectors, sizing calculators, support helpers, platform sizing tools, statistics gathering tools, configuration management tools, etc.

Multi-language module 470 may support multiple development languages (inside and outside the blockchain technology). Multi-language module 470 may also support multiple human languages for client dialog (e.g., written and spoken).

Resource manager module 475 may schedule, monitor, and manage resources of service nodes 130 and distributed consensus network 140. For example, resource manager module 475 may track storage resources, computing resources (CPU and GPU), clients, connections, bandwidth, etc. to determine appropriate if scaling of one or more resources is needed.

Services index module 480 may advertise where services are hosted (e.g., a network address) and provide "gossip" networks for common service members (such as publish and subscribe services).

Message broker module 485 may provide secure communications between nodes (e.g., service nodes 130), between data centers, and outside agents/clients. Message broker module 485 may also provide non-blocking messaging between micro-services; provide well-known queues; allow for adding, changing, removing services without requiring code changes or the operation of other services; and handle service failures or other aberrant state transitions.

The framework modules illustrated in FIG. 4 are non-limiting examples. In other implementations, more, fewer, or different framework modules may be included in framework 330. Additionally, in some implementations, one or more of framework modules 405-485 may be divided into multiple modules or combined with one or more other framework modules.

Figure 5:
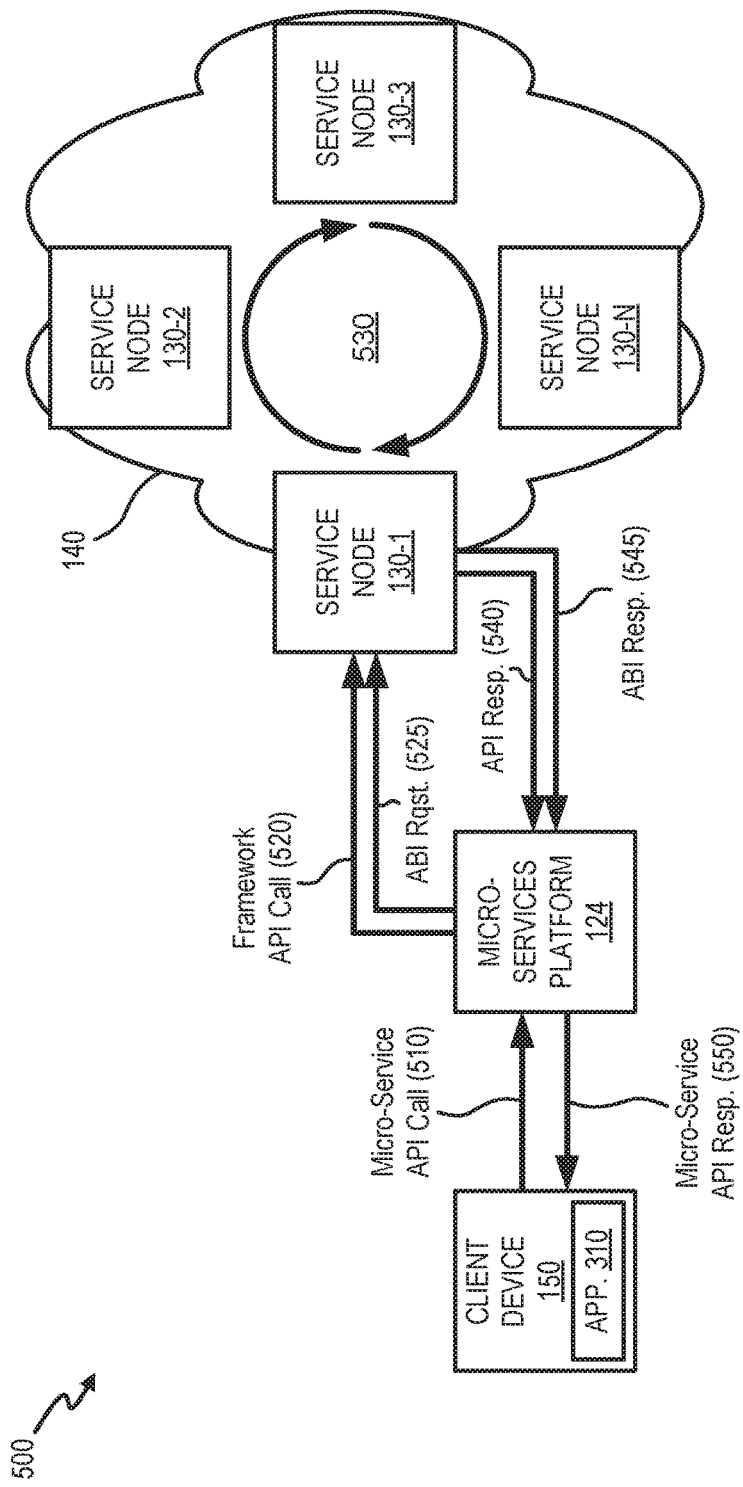
FIG. 5 is a diagram illustrating communications for providing blockchain micro-services in a portion of the network environment of FIG. 1.

FIG. 5 is a diagram illustrating communications for providing blockchain micro-services in a portion 500 of network environment 100. Network portion 500 may include micro-services platform 124, distributed consensus network 140, and client device 150.

As shown in FIG. 5, an application 310 residing on client device 150 may submit a micro-service API call 510 for a particular micro-service accessible through micro-services platform 124. Micro-service API call 510 may identify a particular micro-service that uses the blockchain framework. For example, micro-service API call 510 may request a transaction authentication, an authorization, a new ledger entry, etc., as part of a larger application service. Thus, application 310 may invoke a relevant set of blockchain functions individually (e.g., micro-service(s) or framework service(s)) and does not need to invoke a complete set or pre-configured combination of blockchain functions. In response to micro-service API call 510, micro-service platform 124 may identify multiple framework modules (e.g., any of modules 405 through 485 described above) needed to respond to micro-service API call 510.

Micro-services platform 124 may send one or more different API calls or conduct ABI exchanges with service nodes 130 to gather and/or perform the requested micro-service. For example, micro-services platform 124 may submit a framework API call 520 to a particular instance of a framework component on a service node 130. In other implementations, micro-services platform 124 may submit a multiple framework API calls 520 either simultaneously or sequentially. Simultaneously with (or sequentially to) framework API call 520, micro-services platform 124 may also submit an ABI request 525 to a different framework component on service node 130 (or a different service node 130). Each service node 130 may use a distributed architecture, and this architecture allows for an entity (e.g., application 310, micro-services platform 124, or another service node 130) deploying a service node 130 to pick and choose from an array of blockchain functions/micro-services resulting in deployment of dependent blockchain functions/micro-services as well (i.e., the dependency list is inherent to the micro-service and need not be specified by the entity deploying the service node).

Figure 6:
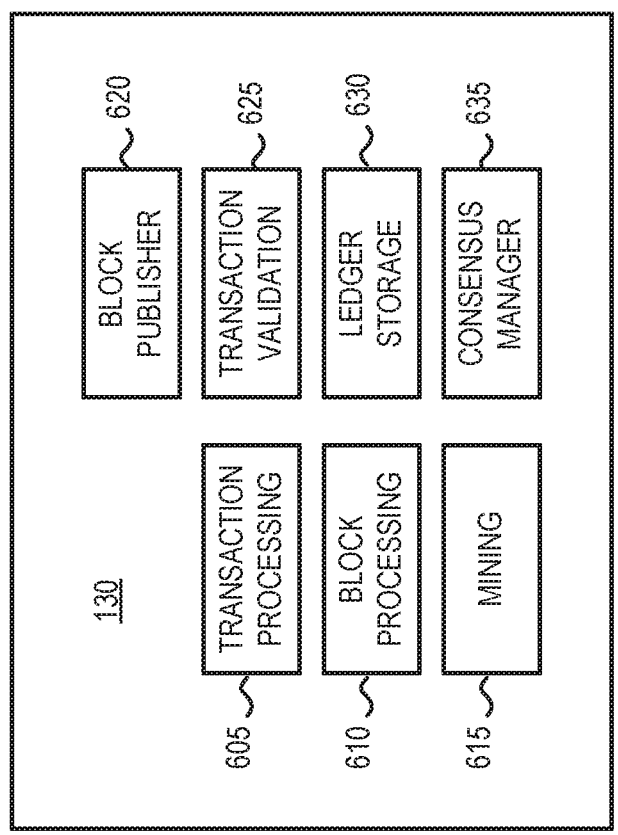
FIG. 6 is a diagram illustrating an exemplary process for managing a blockchain transaction in the distributed network of FIG. 5.

Service node 130 may receive framework API call 520 and ABI request 525 and may implement blockchain protocols to perform a blockchain activity responsive to the requests from micro-services platform 124. Blockchain activity 530 is described further in connection with FIG. 6, which is a diagram illustrating exemplary logical components for managing a blockchain transaction. The logical components may be included within a service node 130 (e.g., implemented as a single network device or a distributed node). Referring to FIG. 6, information from API call 520 and/or ABI request 525 may be registered as a transaction in distributed consensus network 140. A transaction processing unit 605 at each active service node 130 in distributed consensus network 140 gathers a transaction queue. A block processing unit 610 in each service node 130 may perform block processing (e.g., grouping transactions into blocks) and a mining unit 615 may perform blockchain mining operations (e.g., linking a new block to a cryptographic hash of a previous block, calculating a proof-of-work using complex algorithms, etc.) needed for verification and record-keeping.

Still referring to FIG. 6, the first service node 130 to find the answer for a new block will publish the answer (e.g., using block publisher 620) to the other service nodes 130. Each of the other service nodes 130 will validate (using transaction validation unit 625), locally store (in ledger storage 630), and provide consensus (using consensus manager 635) to accept or reject the new block. Although FIG. 6 shows exemplary logical components of service node 130, in other implementations, a services node 130 may include fewer, more, or different logical components, and all service nodes 130 may not include an identical set of logical components.

Returning to FIG. 5, service node 130 may provide a framework API response 540 (e.g., responsive to framework API call 520) and/or an ABI response 545 (e.g., responsive to ABI request 525). In accordance with blockchain activity 530, framework API response 540 and ABI response 545 may indicate a consensus of the participating nodes 130. Micro-services platform 124 may receive both of framework API response 540 and ABI response 545. Micro-services platform 124 may use information from framework API response 540 and ABI response 545 to generate a micro-service API response 550, which is sent to application 310 on client device 150.

Figure 7:
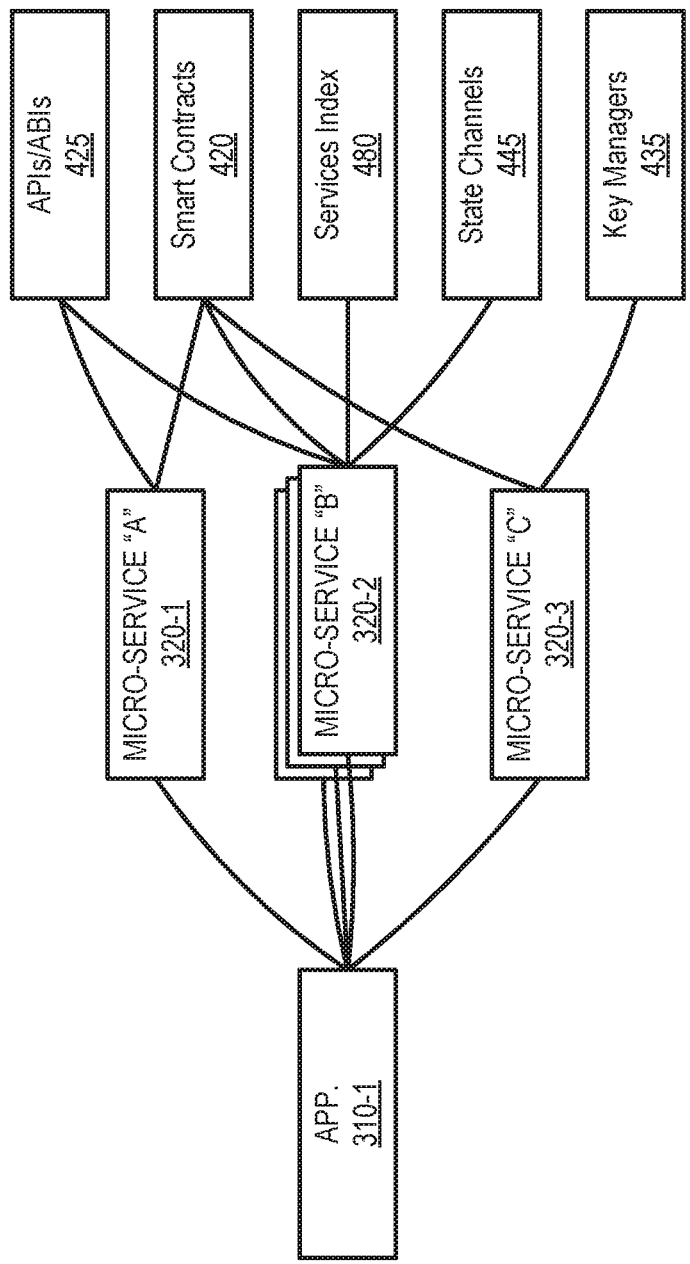
FIG. 7 is a diagram illustrating exemplary interactions for an application accessing multiple micro-services that use different framework items.

FIG. 7 is a diagram illustrating exemplary interactions for an application accessing multiple micro-services that use different framework items. Generally, each micro-service 320 may use different aspects (e.g., modules 405-485) of framework 330, and each application 310 may use different micro-services 320 and a different number of instances of each micro-service 320. Referring to the particular example of FIG. 7, one application 310-1 is shown in relation to three micro-services 320. The three micro-services 320 use several items from framework 330. Application 310-1 uses a single instance of micro-service "A" 320-1 and micro-service "C" 320-3 while using three instances of micro-service "B" 320-2. Micro-service "A" 320-1 uses smart contracts 420 and blockchain APIs/ABIs 425. Each instance of micro-service "B" 320-2 utilizes services index 480, smart contracts 420, blockchain APIs/ABIs 425, and state channels 445. Micro-service "C" 320-3 uses smart contracts 420 and key managers 435.

Thus, the micro-service architecture allows each particular micro-service 320 to scale independently by instantiating new instances of that micro-service. Each micro-service 320 can iterate as many instances as needed. Instances of one micro-service 320 can fail without impacting other instances or services. In some implementations, each micro-service 320 may use memory isolation/failure protection technologies, such as protected memory, virtualization, containerization, etc.

Figure 8:
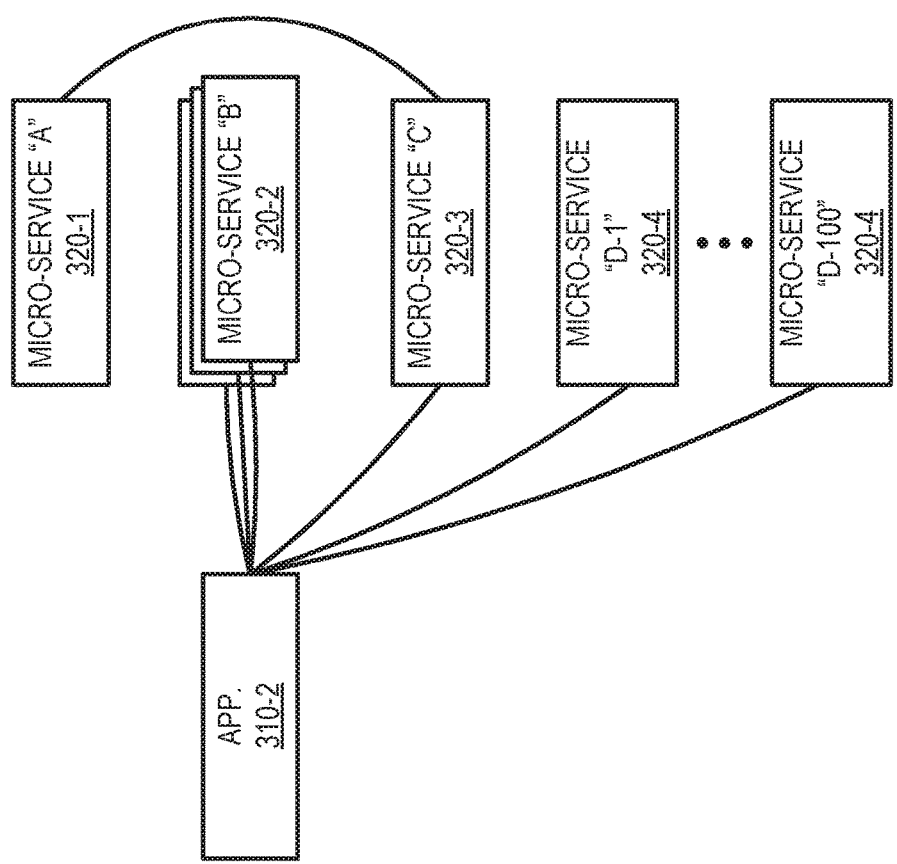
FIG. 8 is a diagram illustrating exemplary interactions for an application accessing multiple micro-services that use other micro-services.

FIG. 8 is a diagram illustrating exemplary interactions for an application accessing multiple micro-services that use other micro-services. Generally, a micro-service 320 can use another micro-service as input into its own process. For example, micro-service "A" 320-1 is shown as providing input to micro-service "C" 320-3 in FIG. 8. In this instance, application 310-2 does not use micro-service "A" 320-1 directly.

Also in the example of FIG. 8, micro-service "D" 320-4 has 100 instances, while micro-service "B" 320-2 has three instances. In hyperscale scenarios, such as the example of FIG. 8, the number of micro-service 320 instances may only be limited by the ability to supply, track, and manage the required resources and locations. The micro-service architecture described herein allows each micro-service "320 to be scaled independently as needed. For example, a micro-service 320 can scale down and then scale up as demand for that particular micro-service decreases and increase. Service nodes 130 in distributed consensus network 140 may scale memory, storage, CPU, GPU, as well as the number of instances.

FIG. 9 provides a flow diagram of an exemplary process 900 for implementing blockchain micro-services. In one implementation, process 900 may be performed by micro-services platform 124. In another implementation, some or all of process 900 may be performed by another device or group of devices, including or excluding devices in provider network 120.

Process 900 may include receiving a micro-services API call, from an application, that requests a micro-service of a blockchain-based technology (block 910). For example, application 310 on client device 150 may generate micro-service API call 510. Micro-service API call 510 may be received at micro-services platform 124. The requested micro-service may require execution of one or more modules of framework 330.

Process 900 may also include sending, in response to the micro-services API call, a framework API call to initiate a framework module in the participating nodes (block 920). For example, based on micro-service API call 510, micro-services platform 124 may send one or more framework API calls 520 to service node 130 to execute a module (e.g., one or more of modules 405-485) of framework 330. In one implementation, the framework module may include an activity or transaction requiring consensus of all service nodes 130 in distributed consensus network 140 that are participating in the particular micro-service.

Process 900 may further include receiving, from one or more of the participating nodes, one or more responses to the framework API calls (block 930). For example, service nodes 130 may perform a blockchain activity 530 responsive to API call 520. The blockchain activity 530 may require publishing of a transaction and consensus of other service nodes 130. The result of blockchain activity 530 may be provided to micro-services platform 124 by one or more of service nodes 130.

Process 900 may additionally include generating, based on the responses to the framework API calls, a reply to the first API call (block 940). For example, after receiving one or more API responses 540, micro-services platform 124 may compile micro-service response 550 and send micro-service response 550 to application 310. Process 900 may be repeated for multiple micro-service API calls from the same application 310 or different applications 310.

As described herein, a blockchain micro-services framework, provides multiple micro-services based on blockchain technologies for a variety of different first-party, hosted, development, and external applications. In addition, the micro-services platform has attributes to allow blockchain technologies to be hosted, built and distributed. These micro-services can be modified and customized, used as building blocks for additional micro-services and full-fledged applications, as well as be used as services between applications or as foundations for applications.

The blockchain micro-services framework allows for fundamental changes to the underlying blockchain technology for a single module (e.g., one of modules 405-485) instead of changes across an entire system and corresponding applications. Further, blockchain micro-services framework can encourage developers to design code in ways that allows for greater interoperability, transparency, and modularity. Implementing blockchain functions based on micro-services may simplify creation of new services which can be pieced together from loosely coupled micro-services. In one implementation, an index of micro-services libraries may be accessed and used by any new or existing application.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a network device, a first application programming interface (API) call from an application, wherein the first API call requests a micro-service of a blockchain-based technology, wherein the blockchain-based technology includes use of a shared ledger among participating nodes in a distributed consensus network, and wherein the micro-service provides a function for the application;

identifying, by the network device, multiple different framework modules of a plurality of framework modules in the participating nodes, to accomplish different aspects of the micro-service;

sending, by the network device and in response to the first API call, second API calls to at least one of the participating nodes, wherein the second API calls initiate the multiple different framework modules to accomplish aspects of the micro-service;

receiving, by the network device and from the at least one of the participating nodes, responses to the second API calls, the responses indicating a consensus of the participating nodes; and generating, by the network device and based on the responses to the second API calls, a reply to the first API call.

2. The method of claim 1, further comprising:
sending, by the network device and to the application the reply to the first API call.

3. The method of claim 1, further comprising:
receiving, by the network device, a third API call from the application, wherein the third API call requests a different micro-service of the blockchain-based technology.

4. The method of claim 1, wherein the network device is one of the participating nodes in the distributed consensus network.

5. The method of claim 1, further comprising:
sending, by the network device and in response to the first API call, a third API call to initiate a different micro-service.

6. The method of claim 1, further comprising:
receiving, by the network device, a third API call from the application, wherein the third API call requests another instance of the micro-service.

7. The method of claim 1, wherein the participating nodes in the distributed consensus network include nodes in a private domain and other nodes in a different private domain.

8. The method of claim 1, wherein the framework module is a smart contract module that includes a read-only application binary interface (ABI) for use by the network device.

9. The method of claim 1, further comprising:
storing, by the network device, an index of micro-services, including the micro-service.

10. The method of claim 1, wherein the micro-service includes a collection of framework modules of the plurality of framework modules.

11. A network device in a distributed consensus network, comprising:
one or more memory devices for storing instructions; and
one or more processors configured to execute the instructions to:
receive a first application programming interface (API) call from an application, wherein the first API call requests a micro-service of a blockchain-based technology, wherein the blockchain-based technology includes use of a shared ledger among participating nodes in a distributed consensus network, and wherein the micro-service provides a function for the application;
identify, multiple different framework modules of a plurality of framework modules in the participating nodes, to accomplish different aspects of the micro-service;
send, in response to the first API call, second API calls to at least one of the participating nodes, wherein the second API calls initiate the multiple different framework modules to accomplish aspects of the micro-service;
receive, from the at least one of the participating nodes, responses to the second API calls, the responses indicating a consensus of the participating nodes; and
generate, based on the responses to the second API calls, a reply to the first API call.

12. The network device of claim 11, wherein the one or more processors are further configured to execute the instructions to:
send to the application the reply to the first API call.

13. The network device of claim 11, wherein the one or more processors are further configured to execute the instructions to:
receive a third API call from the application, wherein the third API call requests a different micro-service of the blockchain-based technology.

14. The network device of claim 11, wherein the network device is one of the participating nodes in the distributed consensus network.

15. The network device of claim 11, wherein the network device is not one of the participating nodes in the distributed consensus network.

16. The network device of claim 15, wherein the one or more processors are further configured to execute the instructions to:
send, by the network device and in response to the first API call, a third API call to initiate a different micro-service.

17. A non-transitory computer-readable medium containing instructions executable by at least one processor, the computer-readable medium comprising one or more instructions to:
receive a first application programming interface (API) call from an application, wherein the first API call requests a micro-service of a blockchain-based technology, wherein the blockchain-based technology includes use of a shared ledger among participating nodes in a distributed consensus network, and wherein the micro-service provides a function for the application;
identify multiple different framework modules of a plurality of framework modules in the participating nodes, to accomplish different aspects of the micro-service;
send, in response to the first API call, second API calls to at least one of the participating nodes, wherein the second API calls initiate the multiple different framework modules to accomplish aspects of the micro-service;
receive, from the at least one of the participating nodes, responses to the second API calls, the responses indicating a consensus of the participating nodes; and
generate, based on the responses to the second API calls, a reply to the first API call.

18. The non-transitory computer-readable medium of claim 17, further comprising one or more instructions to:
store an index of available micro-services, including the micro-service.

19. The non-transitory computer-readable medium of claim 17, further comprising one or more instructions to:
receive a third API call from the application, wherein the third API call requests a different micro-service of the blockchain-based technology.

20. The non-transitory computer-readable medium of claim 17, further comprising one or more instructions to:

sending, in response to the first API call, a third API call to initiate a different micro-service.

* * * * *